(12) United States Patent
Kim et al.

(10) Patent No.: US 9,490,720 B1
(45) Date of Patent: Nov. 8, 2016

(54) POWER CONVERSION WITH SOLID-STATE TRANSFORMER

(71) Applicant: Google Inc., Mountain View, CA (US)

(72) Inventors: Sangsun Kim, San Jose, CA (US); Jimmy Clidaras, Los Altos, CA (US); Cornelius B. O'Sullivan, Mountain View, CA (US); Anand Ramesh, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 13/800,806

(22) Filed: Mar. 13, 2013

(51) Int. Cl.
*H02M 5/293* (2006.01)
*H02M 3/335* (2006.01)
*H02M 5/297* (2006.01)
*H02M 1/42* (2007.01)
*H02M 7/217* (2006.01)

(52) U.S. Cl.
CPC ......... *H02M 3/33576* (2013.01); *H02M 5/293* (2013.01); *H02M 1/4208* (2013.01); *H02M 5/297* (2013.01); *H02M 7/217* (2013.01)

(58) Field of Classification Search
CPC ........... H02M 2001/007; H02M 1/42; H02M 1/4208; H02M 7/217; H02M 7/2176; H02M 7/219; H02M 5/293; H02M 5/297; H02M 5/10
See application file for complete search history.

(56) References Cited

U.S. PATENT DOCUMENTS

| 4,866,585 A | 9/1989 | Das |
| 5,416,687 A | 5/1995 | Beasley |
| 5,731,969 A | 3/1998 | Small |
| 5,943,229 A | 8/1999 | Sudhoff |
| 6,067,243 A * | 5/2000 | Suzuki ............... H02M 7/2173 363/127 |
| 6,115,267 A | 9/2000 | Herbert |
| 7,212,419 B2 * | 5/2007 | Vinciarell ...................... 363/65 |
| 7,564,706 B1 | 7/2009 | Herbert |
| 8,629,629 B2 | 1/2014 | Hariharan |
| 8,654,553 B1 | 2/2014 | Ye et al. |
| 8,693,213 B2 | 4/2014 | Jungreis et al. |
| 2005/0270814 A1 * | 12/2005 | Oh ................................ 363/98 |
| 2007/0253135 A1 * | 11/2007 | Bovitz .................... H02M 1/10 361/118 |
| 2012/0032652 A1 * | 2/2012 | Turchi et al. ................. 323/225 |

* cited by examiner

*Primary Examiner* — Harry Behm
(74) *Attorney, Agent, or Firm* — Fish & Richardson P.C.

(57) ABSTRACT

An electric power supply unit includes a primary stage having an electric converter arranged to increase a frequency of AC power provided to an input of the power supply unit; a transformer stage connected to receive AC power from the primary stage and to reduce a voltage level of the AC power; and a secondary stage connected to receive the AC power at the reduced voltage level and the increased frequency and having a rectifier and power factor correction circuit arranged to convert the AC power to DC power and to provide power factor correction for power entering the power supply unit.

20 Claims, 5 Drawing Sheets

POWER CONVERSION WITH SOLID-STATE TRANSFORMER

TECHNICAL FIELD

This document relates to power converters that use solid state components with a higher frequency transformer for converting power from, for example, medium voltage to low voltage.

BACKGROUND

Electric power, particularly for relatively high-power applications, is frequently generated as high voltage AC power (above about 50 KV) at a utility, and distributed through an electric grid as such. The high voltage power is then stepped down to medium voltage (between about 1 KV and about 50 KV), such as at electrical substations. The medium voltage power may be provided to primary customers, or may be stepped down again to low voltage (below about 1 KV, such as, for example, 120V or 240V) for provision to secondary customers (e.g., home owners).

Computer data centers are a large consumer of electric power. Such data centers may include hundreds or thousands of computer server systems and associated networking equipment, along with support equipment such as HVAC, lighting, and other such equipment that consumes electric power. Electric power thus needs to be provided through a computer data center at appropriate voltages and in an efficient manner because such data centers can operate 24/7 so that efficiency is at a premium.

SUMMARY

The present disclosure discusses systems and methods for processing electric power with an electric distribution system, in the form of power supply units that include electric step-down transformers. In certain examples discussed here, power supplies include a primary converter that increases the frequency of the AC signal in the primary stage of the transformer, and secondary rectification, and power factor correction circuitry, in the secondary stage. The primary converter, in certain examples, takes the form of four pairs of MOSFET or IGBT switches that operate in coordination, with two pairs on each side of the primary stage circuit. The increase in frequency may be a multi-fold increase, including by producing a frequency of 1 KHz to 100 Khz. The secondary stage may obtain rectification via a full-bridge or half-bridge rectifier. The power factor correction may be obtained by a boost converter that places a MOSFET or other high-speed switch between the two sides of the secondary stage circuit. As such, the boost circuit may both control the DC voltage that leaves the stage, and also provide for power factor correction of the primary stage (driving it to unity). Such DC power may then be provided at a pair of terminals for connection to one or more electric loads, such as computer data center server systems.

In some implementations, the structures just described may be repeated for each phase of a three-phase power system, where each phase is run through a separate primary/secondary stage structure as just described. The outputs of the three phase converters may then be combined after the power factor correction and provided to a pair of output terminals as DC power. In such an example, one arm from each of the three structures that serve each respective phase may be connected to a first (positive) terminal, while another may be connected to a second terminal and to a common ground.

In certain implementations, the examples discussed here may provide one or more advantages. For example, an isolated transformer may be provided that is relatively lightweight, efficient, reliable, and low cost. A solid state transformer that converts power through an isolated transformer at higher frequency can offer relatively light weight and compact size, and it can achieve a unity power factor.

Generally, high voltage components are more expensive than are low voltage components (and sometimes the high voltage components may not even be available), so that provision of power factor correction in the low voltage secondary side may help lower the cost of a solution. Such a device may also be installed in more flexible manners due to its smaller size and weight, such as inside a computer data center, and potentially hanging from a ceiling or in other elevated configuration, which may save floor space or provide for greater safety or convenience in access (e.g., by separating the electric components from other components that may need access by other personnel).

In one implementation, an electric power supply unit is disclosed. The unit (which may be housed in a single or multiple housings) comprises a primary stage having an electric converter arranged to increase a frequency of AC power provided to an input of the power supply unit; a transformer stage connected to receive AC power from the primary stage and to reduce a voltage level of the AC power; and a secondary stage connected to receive the AC power at the reduced voltage level and the increased frequency and having a rectifier and power factor correction circuit arranged to convert the AC power to DC power and to provide power factor correction for power entering the power supply unit. The rectifier of the secondary stage can comprise a full bridge rectifier or a half bridge rectifier, and the electric converter of the primary stage can comprise a multilevel electric converter, a half-bridge converter, or a full-bridge converter.

In some aspects, the primary stage is arranged to double the frequency of the AC power provided to the input of the power supply unit. Also, the secondary stage can comprise a boost converter, and can comprise a switch that is controlled by an external controller to switch between arms of the secondary stage to correct a power factor at an input and to maintain a defined voltage at an output of the electric power supply unit. The unit can also include a computer controller connected to the controlled switch, and programmed to switch the controlled switch so as to respond to changes in the AC power provided to the input of the power supply unit by affecting the switching of the controlled switch to push a power factor of the power supply unit toward unity. The primary stage can increase the frequency of AC power by open loop control, and the secondary stage can provide power factor correction using closed loop control. Moreover, the unit can comprise a plurality of separate power factor correction circuits that are each connected to provide power factor correction to a respective phase of a common multi-phase power input.

In another implementation, a method for supplying electric power to one or more loads is disclosed. The method comprises receiving alternating current power at terminals of a power supply unit; converting the power to a higher frequency through a primary converter; transforming the converted power to a lower voltage through a transformer section of the power supply unit; and providing power factor correction to the transformed power in a secondary stage;

and providing the power factor corrected power for use by one or more electric loads. The method can also comprise rectifying the transformed power before providing the power factor correction, and the rectification can be provided by a full bridge rectifier, or a half bridge rectifier. The power supply unit can comprise a multilevel power converter, and the action of converting the power to a higher frequency can comprise increasing the frequency of the power by a factor between 50 and 200.

In some aspects, the power factor correction can be provided by a boost converter and/or by a switch that is controlled by an external controller to switch between arms of the secondary stage to maintain a defined voltage at an output of the electric power supply unit. In addition, the method can include controlling the controlled switch via a controller to switch the controlled switch so as to respond to changes in the AC power provided to the input of the power supply unit by affecting the switching of the controlled switch to push a power factor of the power supply unit toward unity. Also, the primary stage can increases the frequency of AC power by open loop control, and the secondary stage can provide power factor correction using closed loop control.

Other features and advantages will be apparent from the description and drawings, and from the claims.

DETAILED DESCRIPTION

This description discusses systems and techniques for distributing and transforming electric power in a computer data center or other similar facility. In general, such a power supply receives AC power and outputs lower voltage DC power. The voltage is reduced by a transformer stage in a power supply, and the power is converted from AC to DC in a power factor correction stage. The primary stage may increase the frequency of the AC signal so as to reduce the size and weight of a solid-state transformer unit, and the operating efficiency of the power supply can be improved with 50% duty cycle operation (i.e., open loop control) on the primary converter. Unity power factor can be achieved by implementing a PFC stage on the secondary, low voltage side. Such an open-loop structure in the primary stage may achieve cost savings compared to other higher voltage, closed-loop solutions while also providing improved stability in control of a system.

Figure 1A:
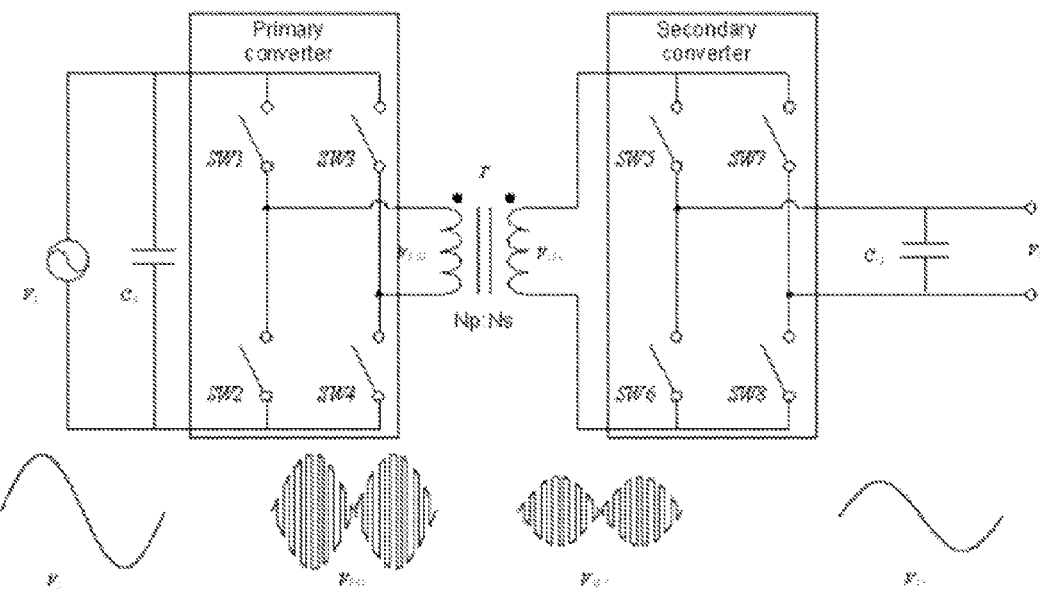
FIG. 1A is a schematic diagram of a solid state transformer of the prior art.

Referring now to FIG. 1A, there is shown a schematic diagram of a solid state transformer of the prior art. Such a transformer includes a primary converter that increases the frequency of the AC power in an isolation transformer before it is transformed to a lower voltage, and a secondary converter that converts the power back to a lower frequency after it is transformed. The solid state transformer uses switches in each of the primary converter and secondary converter that are controlled in coordination to produce the electric signal waveform shown across the bottom of the figure, at each point along the path through the transformer. The solid state transformer can receive power at medium voltage (1 KV-35 KV) and produce power at a secondary voltage around 400V or less (e.g., 208V).

Figure 1B:
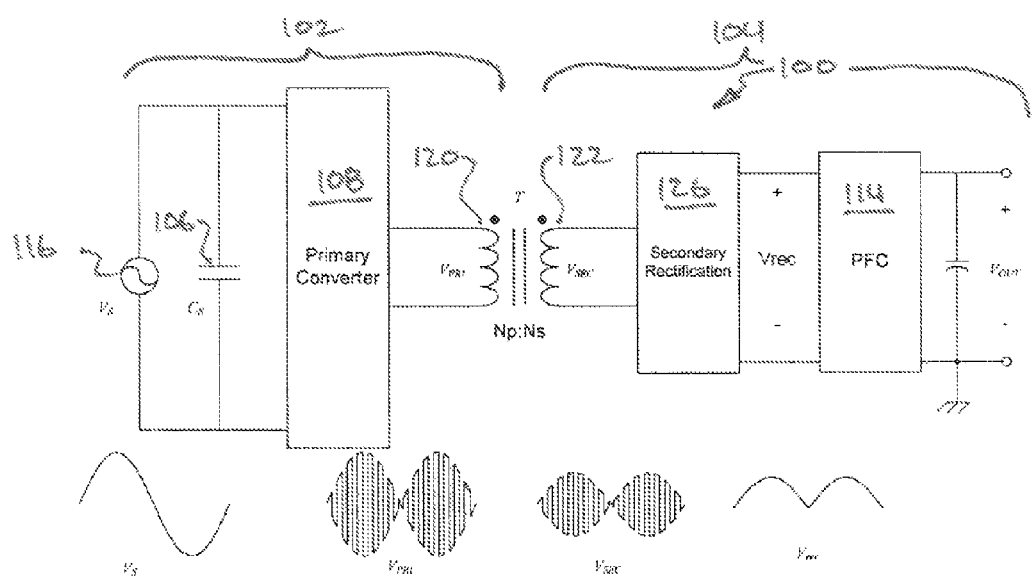
FIG. 1B is a schematic diagram of a solid state transformer having a primary converter, secondary rectification, and power factor correction (PFC).

FIG. 1B is a schematic diagram of a solid state transformer 100 having a primary converter, secondary rectification, and power factor correction (PFC). In general, this transformer 100 (where the term transformer is used here to describe a device that changes the voltage level of an incoming signal, and can include additional auxiliary components surrounding the core transformation stage) has a primary stage 102 and a secondary stage 104 separated by the transformer gap. The primary stage 102 performs conversion of the power to a higher frequency, as shown by the first and second waveforms display along the bottom of the figure. The secondary stage 104 performs rectification and power factor correction, and in doing so can also perform voltage regulation on the power being output from the transformer 100.

Referring more specifically to the primary stage 102, there is a power source 116 shown here as an ideal power source, but which may be an AC power source of various appropriate forms, including medium voltage power received from a utility or produced form high voltage power received from a utility. The power is alternating current power, and is passed as such to the primary converter 108, as mediated by capacitor 106. The AC power leaves the primary converter 108 at a higher frequency than it entered, and is provided to a primary winding 120 of the transformer.

In the secondary stage, a secondary winding 122 of the transformer provides a signal at a lower voltage, and provides it to secondary rectification 126, which as shown by the third and fourth waveforms along the bottom of the figure, rectifies the lower voltage but higher frequency signal into a rectified signal (Vrec from the figure) that is then transformed into a DC signal through a PFC stage. The PFC makes the PFC input current in phase with the rectified voltage (Vrec). The secondary side PFC makes the input ac side power factor corrected.

Figure 1C:
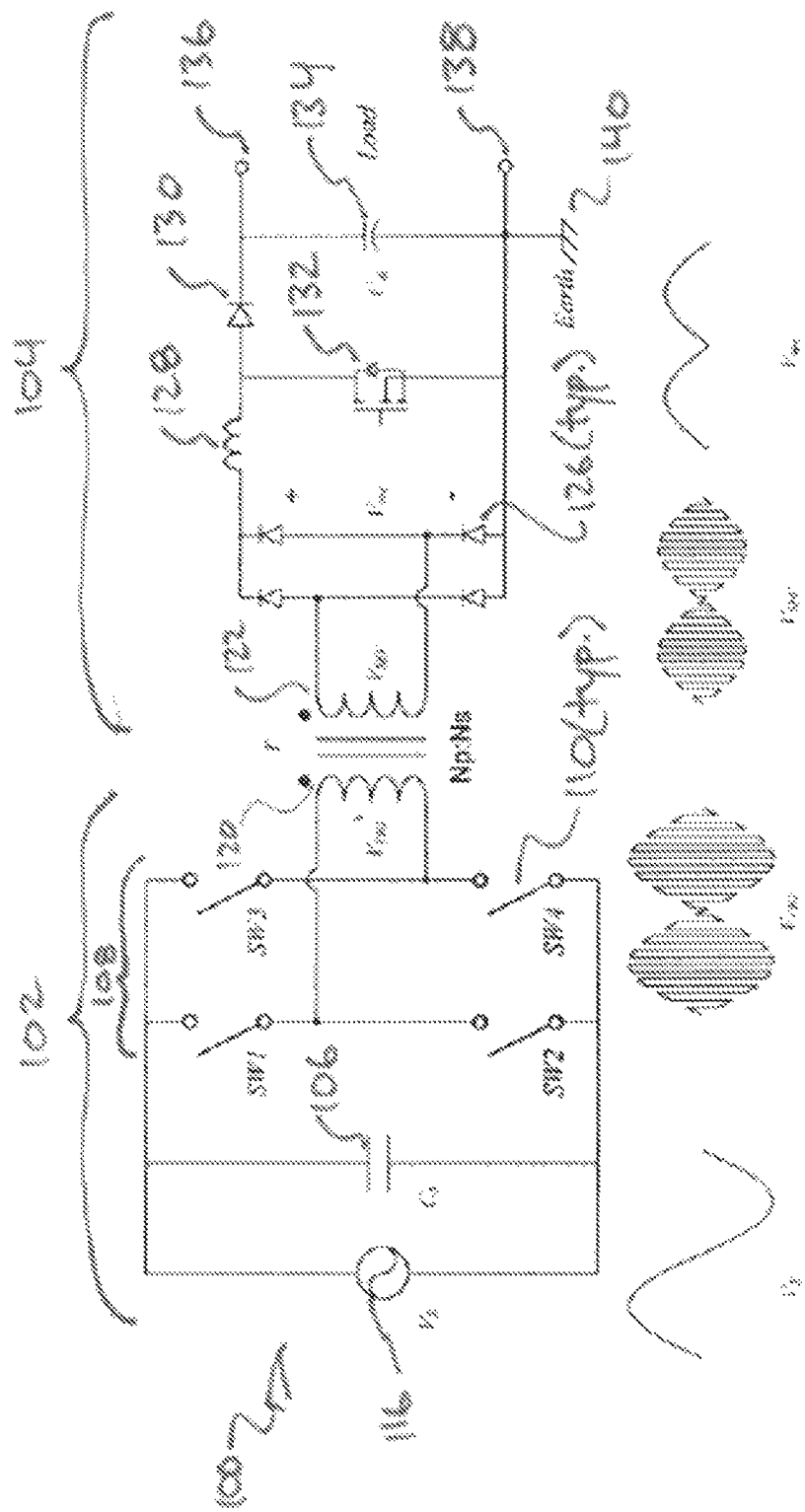
FIG. 1C is a schematic circuit diagram of a solid state transformer having example components corresponding to the transformer of FIG. 1B.

FIG. 1C is a schematic circuit diagram of a solid state transformer having example components corresponding to the transformer of FIG. 1B. Again, the primary stage 102 and secondary stage 104 are shown, and particular example implementations for those stages are shown in this figure. For example, the primary converter 108 is shown here to have a form of four switches 110 in bi-directional switch configuration (which may each be implemented via two IGBTs or MOSFETs in series (or in other implementations by a single IGBT or MOSFET or in a higher number of IGBTs or MOSFET, such as 3-5 or 5-10 IGBTs or MOSFETs, as the particular implementation warrants). Such switching in the primary converter increases the frequency of the AC signal, such as by increasing its frequency such as by a factor of about 30, 50, 100, 150, or 200 (e.g., to 10 kHz), or a factor in the range between any two of those values (e.g., a factor between 100 and 200). The higher frequency may be in a range of 1 kHZ to 100 kHZ, or more specifically, in ranges of 1 khz to 5 khz, 1 khz to 10 kHz, 5 kHz to 10 kHZ, 10 kHz to 25 kHz, 25-50 kHz The AC signal then enters primary winding 120 and is received at a lower voltage by secondary winding 122.

A set of diodes 126 is arranged to form a rectifier (which may be a half bridge or full bridge rectifier), after which the signal may be received by inductor 128, which may be monitored to control the switching of MOSFET switch 132 to provide power factor correction and voltage regulation. Specifically, the inductor 128 acts as an energy storage device by being energized for a particular fraction of the power factor correction unit's switching cycle, and de-energized for the remainder of the cycle. The level of energy transfer determines the input-to-output voltage ratio for the stage, which allows the power supply 100 to provide accurate voltage control.

Such switching is achieved in this example by a MOSFET switch 132. The MOSFET switch 132 may take a number of forms (and could be a MOSFET, IGBT, or other appropriate form of switch). The MOSFET is controlled to switch on and off as appropriate so as to permit conduction or block current flow between the arms of the power factor correction unit so as to produce a properly regulated voltage output at a determined voltage level.

The MOSFET switch 132 can be controlled in an integrated manner by an IC controller (not shown) of various types, such as the Fairchild FAN series of active power factor correction controllers, available from Fairchild Semiconductor Corporation (San Jose, Calif.). Various other controllers may also be used to control the switch 132. The ratio of on time to off time for the MOSFET switch results in appropriate control of the voltage level.

Such current, as regulated by the MOSFET switch 132, may exit the power factor correction unit through a diode 130, and the exiting conductor may be joined with the conductors associated with power from the other phases of the original three-phase AC power that entered the power supply 100.

In operation then, AC power enters the power supply 100 from a power line. The power then passes through the converter 108 to increase its frequency, such as by a positive integer n times, or by a non-integer value. Such AC power is then provided to the transformer stage to reduce its voltage.

That power then leaves the transformer stage and enters the secondary stage, which includes a power factor correction unit, where the rectifiers 126 operate in a conventional manner to replace the negative portion of the AC signal with a mirror-image positive portion. The power then passes out through diode 130 from the power factor correction unit, but is modulated by the high-speed switching of the MOSFET switch 132 operated according the relevant controller that is programmed so as to maintain a consistent and controlled voltage flowing out of the power supply 110. The output is further smoothed by capacitor 134 to produce a usable DC output at terminals 136 and 138—the two being connected through capacitor 134, and the latter being connected to ground 140.

In certain embodiments, the power supply may process three-phase AC power. Such processing may occur constantly and in parallel for the three phases of the power, and the outputs from the portions of the power supply 110 that serve each phase can be combined and provided at terminal 136, while the other outputs are connected to terminal 138 and to a common earth ground 140.

In this manner, then, the power supply 100 as described can provide a highly regulated supply of power at a controlled voltage, and provide power factor correction via circuitry that is in a relatively low voltage stage rather than a higher voltage stage—where low voltage may be about 480 volts or below, 400 volts or below, or 240 volts or below (e.g., between about 0 volts and about 480 volts, where variability may be created by transients and other common factors in an electric generation system).

In this example, the output may be at a voltage level of about 48V or about 12V, or another level usable by electric loads that are connected to the power supply 100. The primary stage may be KV in size, such as about 10 KV to about 50 KV. The power factor correction may, in certain embodiments, be carried out by a boost converter, and the primary converter may take a variety of forms such as bi-directional, uni-directional, or a full bridge, among other things. The secondary stage may achieve power factor correction via a MOSFET for synchronized electrification, which may provide higher efficiency to a related set-up that uses a diode for the PFC.

Figure 2A:
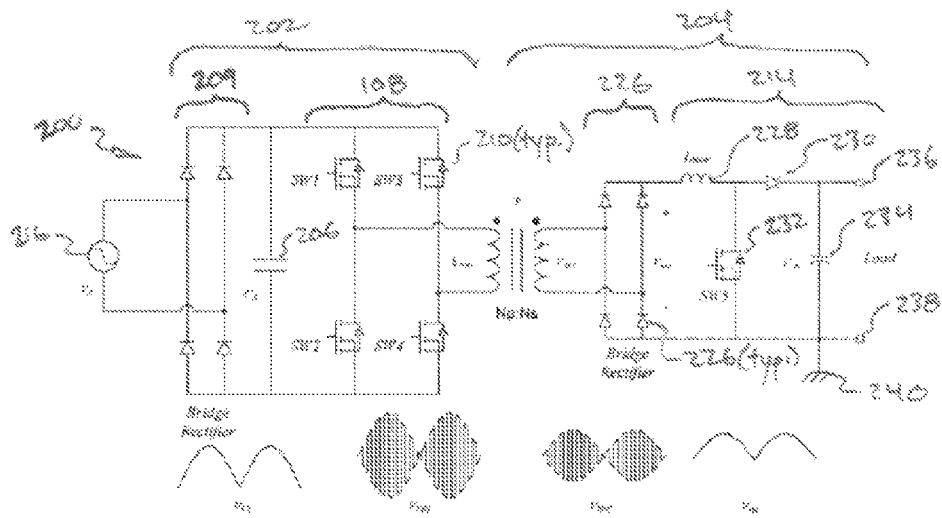
FIG. 2A is a schematic diagram of a solid state transformer having a unidirectional switch with full bridge circuit on the primary stage for higher output voltage.

FIG. 2A is a schematic diagram of a solid state transformer having a unidirectional switch with full bridge circuit on the primary stage for higher output voltage. This example uses the same secondary stage as FIG. 1C, but a slightly more simple primary stage because of the use of uni-directional switches. Specifically, the primary converter may employ four MOSFET switches 210 that switch in coordination to produce an AC signal from a rectified signal that has been produced by a rectifier unit 209. Thus, in this example, the incoming signal is doubled by rectifying it, and then rebuilding it into an AC form. Such an implementation may be achieved relatively inexpensively.

Figure 2B:
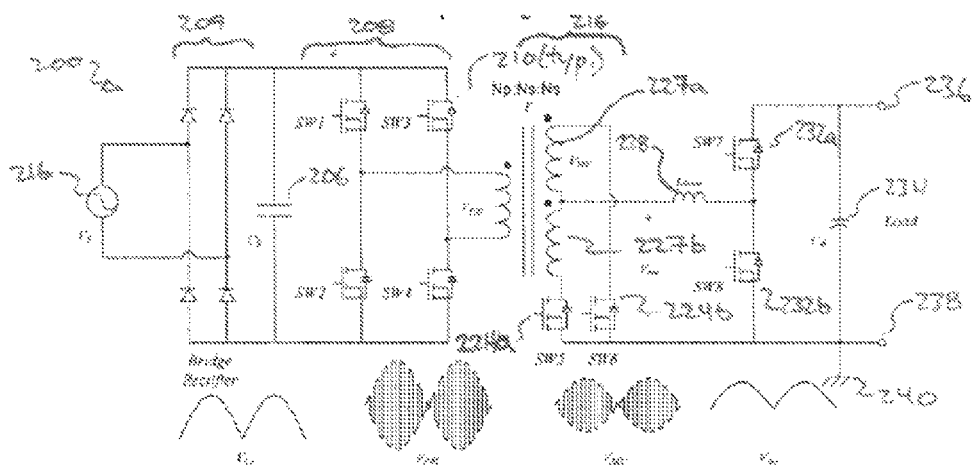
FIG. 2B is a schematic diagram of a solid state transformer having a unidirectional switch with full bridge circuit on the primary stage for lower output voltage.

FIG. 2B is a schematic diagram of a solid state transformer having a unidirectional switch with full bridge circuit on the primary stage for lower output voltage. This implementation has a primary stage that matches the primary stage 202 of FIG. 2A. However, here, the secondary stage is different, so that a greater degree of voltage reduction can be achieved through the transformer stage 216.

Specifically, there are two secondary coils 227a, 227b that in combination provide AC current to inductor 228 whose output is then switched in coordination by a pair of switches 232a, 232b that are operated in coordination by a computer controller (not shown), and by switching in coordination of MOSFET switches 224a, 224b on the ground side of the secondary coils 227a, 227b. Such an arrangement permits the removal of diode 230, which can be particularly advantageous at low voltages because of the lower voltage drop created by both MOSFETs 232a and 232b. Similarly, MOSFETs 224a and 224b help reduce the voltage drop shown in bridge rectifier 226.

Figure 2C:
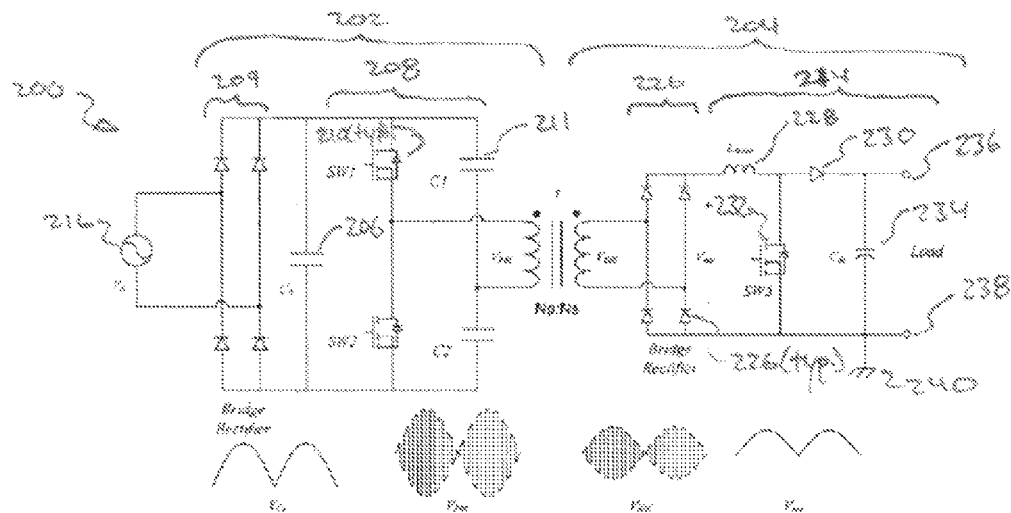
FIG. 2C is a schematic diagram of a solid state transformer having a unidirectional switch with half bridge circuit on the primary stage.

FIG. 2C is a schematic diagram of a solid state transformer having a unidirectional switch with half bridge circuit on the primary stage. In this example, the secondary stage 204 is like that in FIG. 2A, and the primary stage 202 is somewhat like that in FIG. 2B (and the secondary stage can be implemented with the systems of either FIG. 2A or 2B), but the primary converter uses a pair of capacitors 211 matched with MOSFET (or IGBT) switches 210 to convert AC signal to a higher frequency. This approach uses a half-bridge converter on the primary side. As a result, such implementation provides a balance between efficiency and component cost.

Figure 2D:
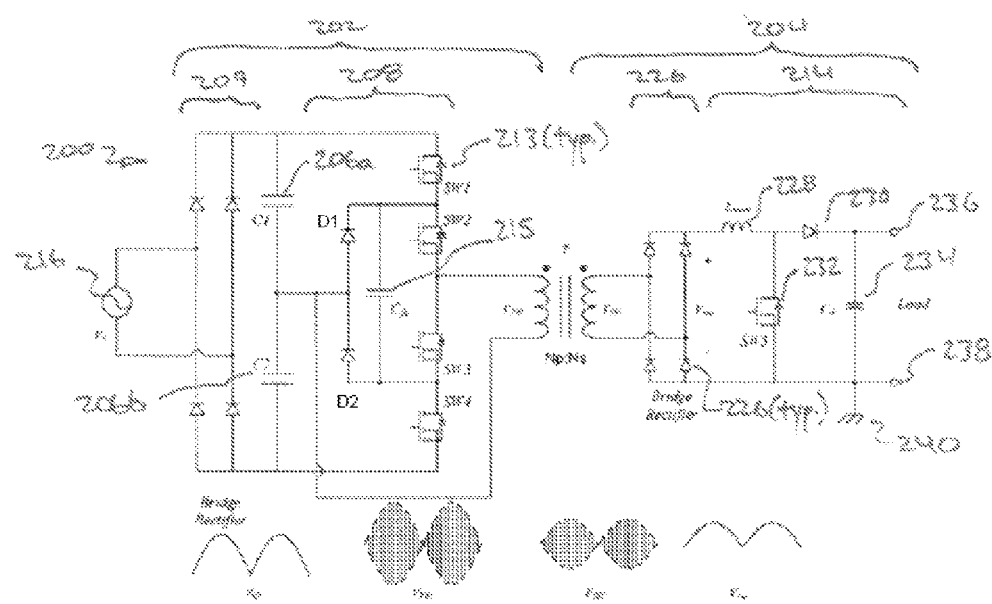
FIG. 2D is a schematic diagram of a multi-level converter in a half-bridge configuration.

FIG. 2D is a schematic diagram of a multi-level converter in a half-bridge configuration. This implementation shows a multi-level converter on the primary stage 202. Again, the secondary stage 204 is similar to that in FIG. 2A or 2B.

Referring more specifically to the primary stage, a bridge rectifier initially receives the incoming AC signal and rectifies it. The input voltage is too high, however, for basic semiconductor solid state switches, which may cause the switches to be unable to provide the necessary breakdown voltage. As a result, the multi-level converter is used, where a plurality of switches 213 are stacked in series on each opposed side of the converter as shown in FIG. 2D. Capacitor 215 connected to the two branches of such converter acts as a flying capacitor.

In this arrangement, then, the four switches are controlled via 50% duty cycle based open-loop control that can be used with high voltages by splitting and reducing the voltage handled by any particular components on the primary side. For example, where the voltage handled is 6000V, SW1 and SW2 may each take on 3000V (as may SW3 and SW4), where each such switch may take on only 3000V. The voltage across C1 and C2, though, may be 3000V.

In other examples, such components may be further stacked to permit the service of even higher voltages with components that are rated at much lower voltages than the transformer input voltage. For example, to handle 50 KV input, a series of semiconductor switches like SW1 to SW4 may be stacked in series so that the voltage is divided evenly between and among each of the switches in the series. The switching of the solid state switches may then be controlled in an appropriate manner (via control on their respective gates) so as to provide the frequency increase that is desired.

Figure 3:
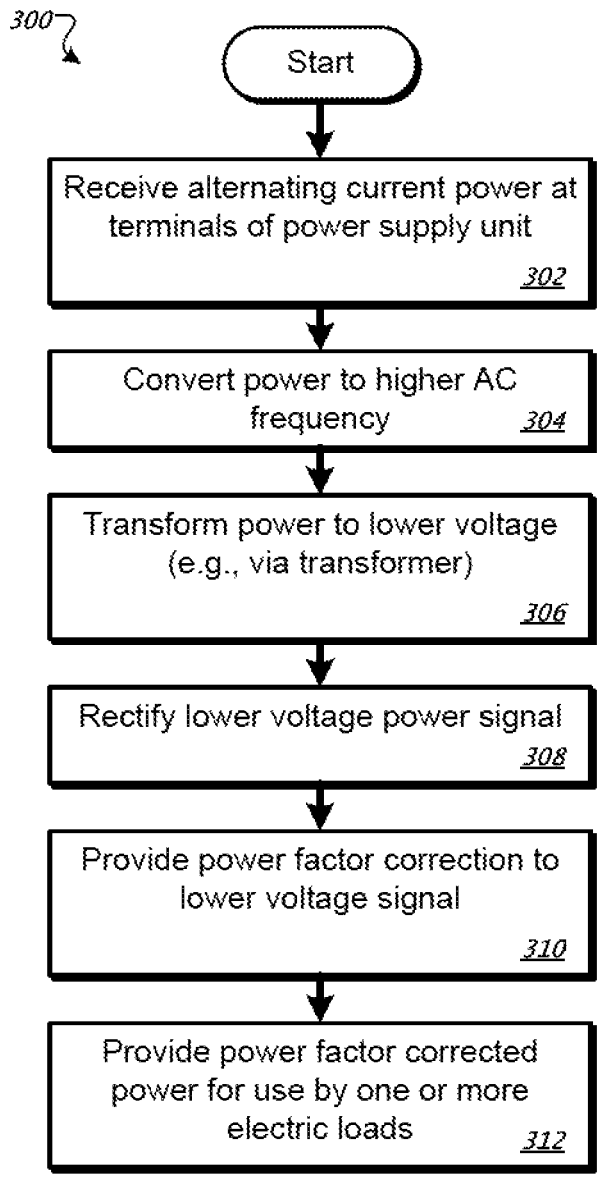
FIG. 3 is a flow chart of a process for transforming AC power and supplying a regulated DC power level.

FIG. 3 is a flow chart of a process 300 for transforming AC power and supplying a regulated DC power level. In general, the process involves increasing the frequency of incoming AC power before transforming and rectifying it, and involves the application of power factor correction on the transformed, lower-voltage power so as to obtain, in certain implementations, unity power factor for the converter via relative simple, inexpensive, and reliable mechanisms. In particular implementations, the process may be performed either in whole or in part by apparatuses like those shown and discussed above with respect to FIGS. 2A-2D.

The process begins at box 302, where alternating current power is received at terminals of a power supply unit. Such power may be received, for example, at a medium voltage level (e.g., multiple KV) and at, for example, 60 Hz or other standard distribution frequency and voltage for medium voltage power for the jurisdiction in which the system operates. The received power may have previously been stepped down from high-voltage power, or such conversion may occur as part of the same device or sub-system in which the conversion from medium voltage to low voltage occurs.

At box 304, the power is converted to a higher frequency of AC at the same voltage. For example, the frequency can be increased by values discussed above (e.g., to 10 kHz). Such conversion may occur via appropriately controlled switching of the signal, full-bridge or half-bridge rectification, and various combinations of techniques such as those described above with respect to FIGS. 2A-2D. The conversion may thus result in a signal that appears as two overlapped and in-phase sine waves, such as shown in the representations in FIGS. 2A-2D.

At box 306, the power that has been converted to a higher frequency is transformed to a lower voltage through a transformer section of the power supply unit. The transformation may occur in standard manners, by a primary phase having a certain number of windings, and one or more secondary phases having corresponding different numbers of windings—e.g., where the proportion of primary to secondary windings is the same as the proportion of medium voltage level to low voltage level. The secondary phases may include multiple cores, such as to provide multiple separate low voltage output circuits.

At box 308, the reduced voltage at higher frequency may be rectified to a low frequency AC in a rectification stage, which may take the form of a bridge or other appropriate structure. Such a bridge may, for example, be formed by a set of four diodes that are arranged so that negative portions of the signal are converted into corresponding positive portions of the signal, for example. At this point, the signal is rectified at low voltage, such as at 480V.

At box 310, power factor correction is provided to the transformed power in the low voltage, secondary stage. Such power factor correction may be provided, for example, by a controlled switch such as a MOSFET that is connected between the positive and ground arms of the circuit, where the switching is performed to maintain unity power factor at the input of the apparatus. The switch may be controlled, for example, by a controller, such as one of a variety of available power factor correction controllers, so as to respond to changes in the AC power provided to the input of the power supply unit by affecting the switching of the controlled switch to push a power factor of the power supply unit toward unity. The controller may be provided an input from various locations in the apparatus, and may respond to that signal in a manner known to control the apparatus to provide the proper power factor correction.

Finally, at box 312, the power factor corrected power is provided for use by one or more electric loads. Such power may be provided via a pair of terminals, where one terminal may be at the regulated voltage with DC power, and the other terminal may be tied to ground. The use of the term "terminals" is intended here to cover a variety of connections, including hardwired connects to the load, so that separate conductive pads with connectors are not required. The load in this example may typically include one or more bays and/or racks of computer servers for installation in a computer data center. For example, a bay may include approximately 30 trays that each hold one or more motherboards that may each in turn have mounted to them a plurality of microprocessors and associated chips (e.g., controllers, RAM, etc.), where each microprocessor may include a plurality of computing cores. The bay may also have mounted to it networking components for providing communications between the trays in the bay and between the bay and other bays, and between the bay and a central system. Each of these components may demand and use power provided by the converter via the process just discussed. Other bays in the data center may be served in similar manners from other power converters that operate in the same manner discussed here. Also, controllers for providing power factor in the processes operated for each converter may be coordinated so as to provide more stable power factor correction, to reduce the cost and complexity of the control (e.g., by having a single control chip or device controller a plurality of different power factor correction circuits) further comprising controlling the controlled switch via a controller to switch the controlled switch so as to respond to changes in the AC power provided to the input of the power supply unit by affecting the switching of the controlled switch to push a power factor of the power supply unit toward unity.

Many other implementations other than those described may be employed, and may be encompassed by the following claims.

What is claimed is:

1. An electric power supply unit, comprising:
   a primary stage having an electric converter arranged to receive an AC power input and increase a frequency of the AC power input provided to an input of the power supply unit, wherein the primary stage is arranged to maintain the AC power input as an alternating current through the primary stage, wherein the primary stage is arranged to increase the frequency of the AC power input by a multiple of at least two;
   a transformer stage connected to receive AC power from the primary stage and to reduce a voltage level of the AC power; and
   a secondary stage connected to receive the AC power at the reduced voltage level and the increased frequency and having a rectifier and power factor correction circuit arranged to convert the AC power to DC power and to provide power factor correction for power entering the power supply unit.

2. The power supply unit of claim 1, wherein the rectifier of the secondary stage comprises a full bridge rectifier.

3. The power supply unit of claim 1, wherein the rectifier of the secondary stage comprises a half bridge rectifier.

4. The power supply unit of claim 1, wherein the electric converter of the primary stage comprises a multilevel electric converter.

5. The power supply unit of claim 1, wherein the secondary stage comprises a boost converter.

6. The power supply unit of claim 1, wherein the secondary stage comprises a switch that is controlled by an external controller to switch between arms of the secondary stage to correct a power factor at an input and to maintain a defined voltage at an output of the electric power supply unit.

7. The power supply unit of claim 6, further comprising a computer controller connected to the controlled switch, and programmed to switch the controlled switch so as to respond to changes in the AC power input provided to the input of the power supply unit by affecting the switching of the controlled switch to push a power factor of the power supply unit toward unity.

8. The power supply unit of claim 1, wherein the primary stage increases the frequency of AC power input by open loop control.

9. The power supply unit of claim 8, wherein the secondary stage provides power factor correction using closed loop control.

10. A method for supplying electric power to one or more loads, the method comprising:
    receiving alternating current power at terminals of a power supply unit;
    converting the power to a higher frequency through a primary converter, wherein the power is maintained as alternating current through the primary converter, wherein the primary converter is arranged to increase the frequency of the alternating current power by a multiple of at least two;
    transforming the converted power to a lower voltage through a transformer section of the power supply unit;
    providing power factor correction to the transformed power in a secondary stage; and
    providing the power factor corrected power for use by one or more electric loads.

11. The method of claim 10, further comprising rectifying the transformed power before providing the power factor correction.

12. The method of claim 11, wherein the rectification is provided by a full bridge rectifier.

13. The method of claim 11, wherein the rectification is provided by a half bridge rectifier.

14. The method of claim 10, wherein the power supply unit comprises a multilevel power converter.

15. The method of claim 10, wherein converting the power to a higher frequency comprises increasing the frequency of the power by a factor between 50 and 200.

16. The method of claim 10, wherein the power factor correction is provided by a boost converter.

17. The method of claim 10, wherein the power factor correction is provided by a switch that is controlled by an external controller to switch between arms of the secondary stage to maintain a defined voltage at an output of the electric power supply unit.

18. The method of claim 17, further comprising controlling the controlled switch via a controller to switch the controlled switch so as to respond to changes in the alternating current power provided to the input of the power supply unit by affecting the switching of the controlled switch to push a power factor of the power supply unit toward unity.

19. The method of claim 10, wherein the primary stage increases the frequency of alternating current power by open loop control.

20. The method of claim 19, wherein the secondary stage provides power factor correction using closed loop control.

* * * * *